United States Patent
Park et al.

(10) Patent No.: US 7,836,277 B2
(45) Date of Patent: Nov. 16, 2010

(54) PRE-TRACING INSTRUCTIONS FOR CGA COUPLED PROCESSOR IN INACTIVE MODE FOR EXECUTION UPON SWITCH TO ACTIVE MODE AND CONTINUING PRE-FETCHING CACHE MISS INSTRUCTIONS

(75) Inventors: Il Hyun Park, Yongin-si (KR); Dong-Hoon Yoo, Suwon-si (KR); Dong Kwan Suh, Uiwang-si (KR); Soojung Ryu, Cheonan-si (KR); Jeongwook Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 76 days.

(21) Appl. No.: 12/042,868

(22) Filed: Mar. 5, 2008

(65) Prior Publication Data

US 2009/0077349 A1      Mar. 19, 2009

(30) Foreign Application Priority Data

Sep. 13, 2007    (KR) ...................... 10-2007-0093045

(51) Int. Cl.
G06F 9/06 (2006.01)
(52) U.S. Cl. ........................................ 712/207; 712/43
(58) Field of Classification Search .................. None
See application file for complete search history.

(56) References Cited

U.S. PATENT DOCUMENTS

| | | | | |
|---|---|---|---|---|
| 5,285,527 A | * | 2/1994 | Crick et al. ................... 711/118 |
| 5,961,631 A | * | 10/1999 | Devereux et al. ............ 712/207 |
| 6,026,471 A | * | 2/2000 | Goodnow et al. ............ 711/137 |
| 6,212,603 B1 | * | 4/2001 | McInerney et al. .......... 711/125 |
| 6,647,487 B1 | * | 11/2003 | Undy et al. ................... 712/207 |
| 6,681,318 B2 | * | 1/2004 | Chaudhry et al. ............ 712/207 |
| 7,421,567 B2 | * | 9/2008 | Eickemeyer et al. ........ 712/219 |
| 2004/0015683 A1 | | 1/2004 | Emma et al. |
| 2005/0138628 A1 | * | 6/2005 | Bradford et al. ............ 718/107 |
| 2007/0033385 A1 | | 2/2007 | Smaus et al. |
| 2007/0186085 A1 | * | 8/2007 | Yim et al. .................... 712/244 |

FOREIGN PATENT DOCUMENTS

| | | |
|---|---|---|
| KR | 10-1999-0066807 | 8/1999 |
| KR | 10-2002-0061129 | 7/2002 |
| KR | 10-2007-0059837 | 6/2007 |

\* cited by examiner

Primary Examiner—Kenneth S Kim
(74) Attorney, Agent, or Firm—NSIP Law

(57) ABSTRACT

A method of managing an instruction cache and a process of using the method are provided. The processor may comprise a processor core which is operated either during an active mode or during an inactive mode wherein the process core performs at least one instruction during the active mode, an instruction cache which pre-traces a first instruction and determines, during the inactive mode, whether the processor core will meet a cache miss with regard to the first instruction, wherein the first instruction is to be performed by the processor core during the active mode, a coarse-grained array which performs a second instruction during the inactive mode, and a configuration memory which stores configuration information of the coarse-grained array, wherein the coarse-grained array performs the second instruction using the configuration information.

9 Claims, 12 Drawing Sheets

PRE-TRACING INSTRUCTIONS FOR CGA COUPLED PROCESSOR IN INACTIVE MODE FOR EXECUTION UPON SWITCH TO ACTIVE MODE AND CONTINUING PRE-FETCHING CACHE MISS INSTRUCTIONS

CROSS-REFERENCE TO RELATED APPLICATION

This application claims the benefit under 35 U.S.C. §119(a) of a Korean Patent Application No. 10-2007-0093045, filed on Sep. 13, 2007, in the Korean Intellectual Property Office, the entire disclosure of which is incorporated herein by reference.

TECHNICAL FIELD

The following description relates to a reconfigurable processor architecture, and more particularly, to a reconfigurable processor having at least two operational modes.

BACKGROUND

In a conventional art, operation processing apparatuses have been embodied using hardware or software. For example, when a network controller for performing as a network interface is installed on a computer chip, the network controller performs only a network interfacing function that is defined during its fabrication in a factory. Therefore, after fabrication of the network controller, it may not be possible to change the function of the network controller. This is an example of a hardware embodiment scheme. Another scheme uses software. For example, a user's intention may be satisfied by a program to perform the user's desired functions and executing the program in a general purpose processor. A software embodiment scheme enables a new function to be performed by replacing only software even after hardware was fabricated in the factory. When using software, it is possible to perform various types of functions using the given hardware, however, execution speed decreases in comparison to the hardware embodiment scheme.

In order to overcome the above-described disadvantages of the hardware and software schemes, a reconfigurable processor architecture was proposed. The reconfigurable processor architecture may be customized to solve a given problem even after device fabrication. Also, the reconfigurable processor architecture may use a spatially customized calculation to perform calculations.

The reconfigurable processor architecture may be embodied by using a coarse-grained array (CGA) and a processor core that can process a plurality of instructions in parallel.

A general processor uses a cache to more effectively use a memory. The cache is installed between the processor and a main memory, is smaller than the main memory, and can operate more quickly than the main memory.

Elements affecting the performance of a cache memory system include a cache hit ratio, a data access time in a cache hit state, a penalty in the case where a cache miss occurs, and the like.

Accordingly, there is a need for a method to reduce a cache miss when operating a reconfigurable processor in a processor core mode, and a processor, having a CGA mode and a processor core mode, using the method.

SUMMARY

In one general aspect, there is provided a method which eliminates a cache miss, which would occur in the future, without using a predictive algorithm, and a processor of using the method.

In another aspect, there is provided a method which reduces the complexity of a cache and minimizes a cache miss, and a processor of using the method.

In still another aspect, there is provided a method which eliminates only a cache miss, which definitely occurs in the future and thereby reducing an instruction performance cycle in any case, without a penalty caused by a prediction failure, and a processor of using the method.

In yet another aspect, there is provided a method which eliminates a cache miss without contention when accessing an available memory, and reduces an instruction performance cycle.

According to an aspect, there is provided a processor including a processor core which has an active mode and an inactive mode, and an instruction cache which pre-traces a first instruction and detects a cache miss during the inactive mode, wherein the first instruction is performed by the processor core during the active mode.

According to another aspect, there is provided a method of managing an instruction cache, the method including generating a pseudo program counter value when a processor core is in an inactive mode, determining whether a pre-traced instruction corresponding to the pseudo program counter value is stored in an instruction cache, receiving the pre-traced instruction from an external memory to store in the instruction cache when the pre-traced instruction is not stored in the instruction cache, and increasing the pseudo program counter value by 1 when the pre-traced instruction is stored in the instruction cache.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, the same drawing reference numerals will be understood to refer to the same elements, features, and structures.

DETAILED DESCRIPTION

The following detailed description is provided to assist the reader in gaining a comprehensive understanding of the methods and systems described herein. Accordingly, various changes, modifications, and equivalents of the systems and methods described herein will be suggested to those of ordinary skill in the art. Also, descriptions of well-known functions and constructions are omitted to increase clarity and conciseness.

Figure 1:
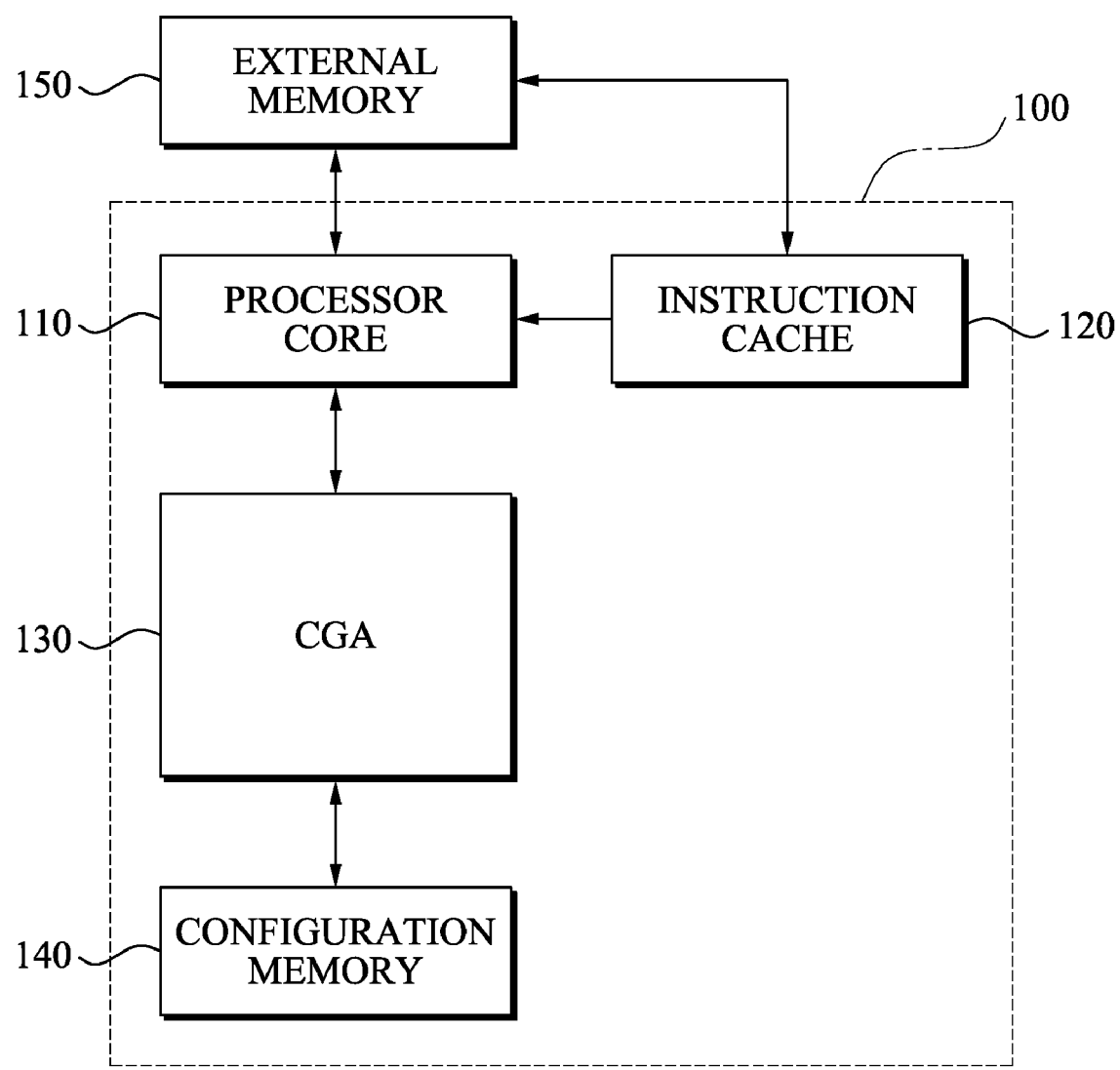
FIG. 1 is a block diagram illustrating a processor according to an exemplary embodiment.

FIG. 1 is a block diagram illustrating a processor 100 according to an exemplary embodiment.

Referring to FIG. 1, the processor 100 includes a processor core 110, an instruction cache 120, a coarse-grained array (CGA) 130, and a configuration memory 140. The processor 100 is connected to an external memory 150.

The processor core 110 has a first operational mode and a second operational mode.

The instruction cache 120 pre-traces a first instruction and detects a cache miss during the second operational mode. The first instruction is performed by the processor core 110 during the first operational mode.

The instruction cache 120 generates a pseudo program counter (pseudo PC). The instruction cache 120 changes a value of the pseudo PC to pre-trace the first instruction.

When the cache miss associated with the first instruction is detected, the instruction cache 120 receives the first instruction from the external memory 150 and stores the received first instruction.

A process of receiving the first instruction from the external memory 150 and storing the received first instruction in the instruction cache 120 is referred to as "line filling process".

The CGA 130 performs a second instruction during the second operational mode.

The configuration memory 140 stores configuration information of the CGA 130. The CGA 130 receives the configuration from the configuration memory 140, and performs the second instruction by using the received configuration information.

The processor core 110 receives the first instruction from the instruction cache 120 during the first operational mode, and performs the received first instruction.

The processor core 110 may be idle during the second operational mode, and does not access the instruction cache 120.

The CGA 130 may be idle during the first operational mode.

The CGA 130 receives the configuration information from the configuration memory 140 during the second operational mode. The CGA 130 does not access the instruction cache 120 during either the first operational mode or the second operational mode.

Figure 2:
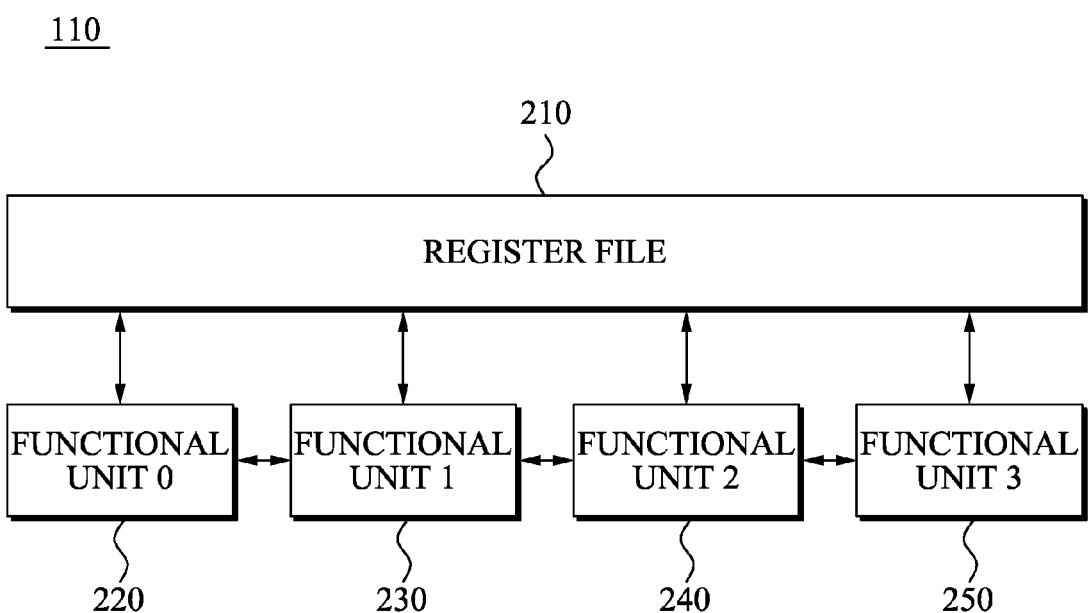
FIG. 2 is a diagram illustrating a processor core of FIG. 1.

FIG. 2 is a diagram illustrating the processor core 110 of FIG. 1.

Referring to FIG. 2, the processor core 110 includes a register file 210, a functional unit (functional unit 0) 220, a functional unit (functional unit 1) 230, a functional unit (functional unit 2) 240, and a functional unit (functional unit 3) 250.

The functional unit 220 performs the first instruction during the first operational mode and stores the operational result in the register file 210. The functional unit 220 may transfer the operational result to the functional unit 230.

The first instruction may include four instructions that are performed in one clock period.

Which instruction among four instructions will be assigned to which functional unit among the functional units 220, 230, 240, and 250 may be determined by scheduling of a compiler.

Specifically, the compiler performs scheduling and thereby determines which instruction among four instructions will be assigned to which functional unit among the functional units 220, 230, 240, and 250 based on characteristics of the functional units 220, 230, 240, and 250.

The register file 210 stores operational results of instructions that are performed by the functional units 220, 230, 240, and 250.

The processor core 110 may perform a maximum of four instructions in parallel in one clock period by using the four functional units 220, 230, 240, and 250.

According to other embodiments, the processor core 110 may have a very long instruction word (VLIW) structure.

Figure 3:
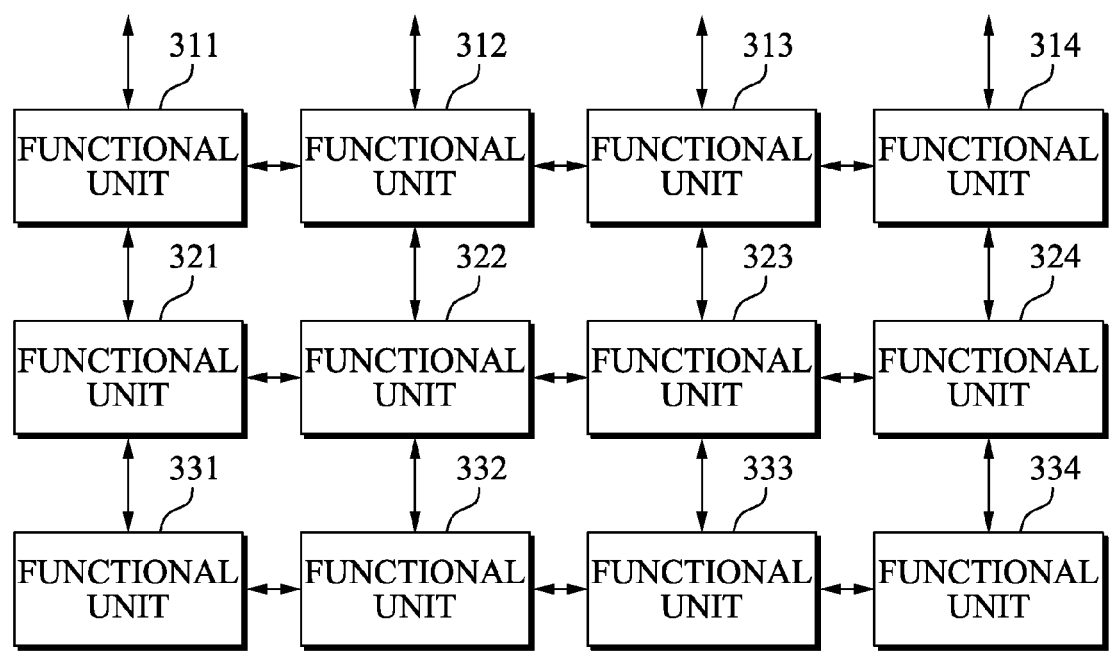
FIG. 3 is a diagram illustrating a coarse-grained gray (CGA) of FIG. 1.

FIG. 3 is a diagram illustrating the CGA 130 of FIG. 1.

Referring to FIG. 3, the CGA 130 includes twelve functional units 311, 312, 313, 314, 321, 322, 323, 324, 331, 332, 333, and 334.

The functional unit 311 may transfer operational results, which are obtained by performing instructions, to the processor core 110, or may transfer the operational results to the functional unit 312 or the functional unit 321.

The functional unit 321 may perform another instruction by using the operational results that are obtained when the functional unit 311 performs the instruction.

Configuration information includes information about connections among the functional units 311, 312, 313, 314, 321, 322, 323, 324, 331, 332, 333, and 334 of the CGA 130. The configuration information is stored in the configuration memory 140.

Figure 4:
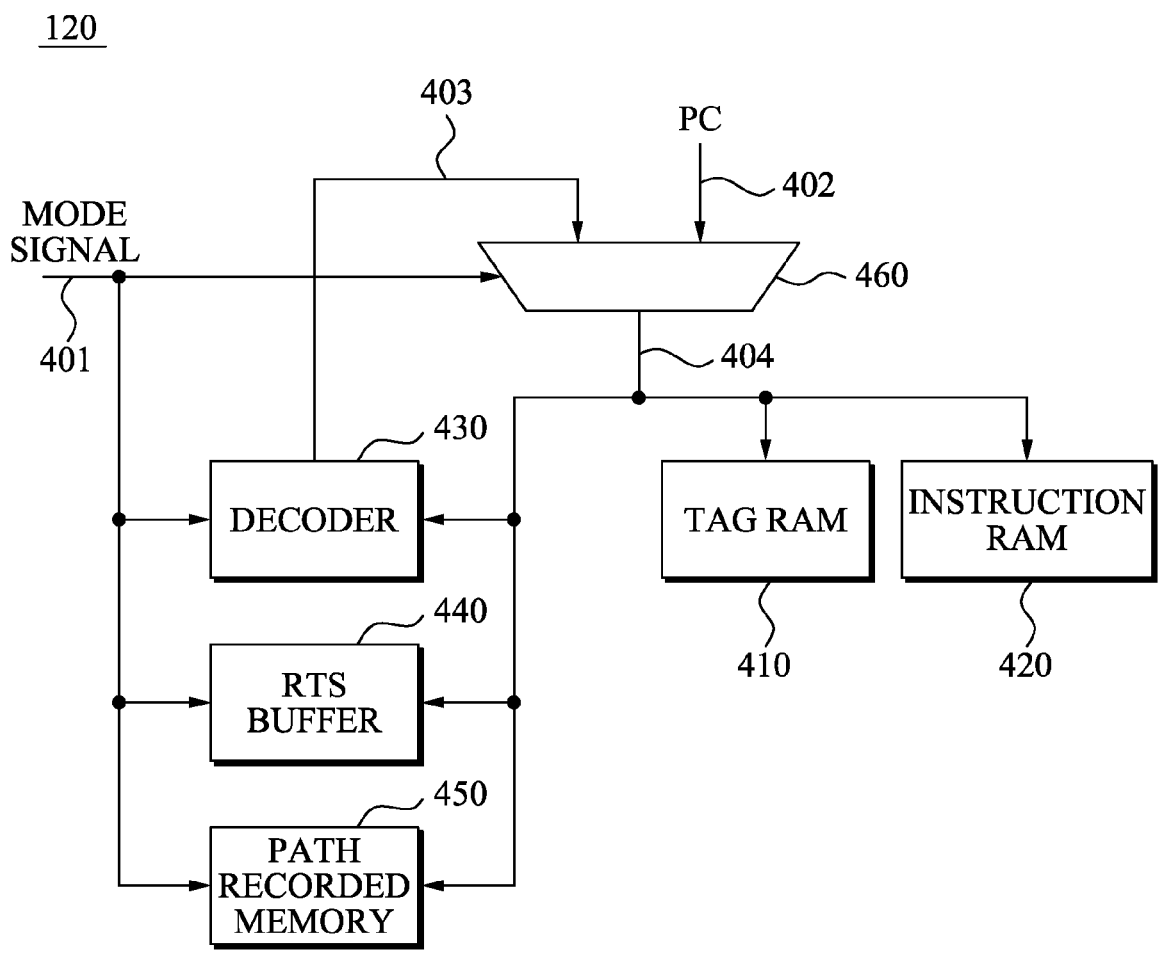
FIG. 4 is a diagram illustrating an example of an instruction cache of FIG. 1.

FIG. 4 is a diagram illustrating an example of the instruction cache 120 of FIG. 1.

Referring to FIG. 4, the instruction cache 120 includes a tag Random Access Memory (RAM) 410, an instruction RAM 420, a decoder 430, a return from subroutine (RTS) buffer 440, a path recorded memory 450, and a multiplexer 460.

The decoder 430 receives a mode signal 401. When the received mode signal 401 is a signal corresponding to the second operational mode, the decoder 430 generates a pseudo PC signal 403.

When the pseudo PC signal 403 is generated in the processor core 110 during a first operational mode, the first instruction is pre-traced, which has been described above with reference to FIG. 1.

The multiplexer 460 selects any one of a PC signal 402 and the pseudo PC signal 403 depending on the mode signal 401, and outputs the selected signal as the output signal 404.

The multiplexer 460 selects the PC signal 402 as the output signal 404 when the mode signal 401 is a signal corresponding to the first operational mode, and selects the pseudo PC signal 403 as the output signal 404 when the mode signal 401 is a signal corresponding to the second operational mode.

The tag RAM 410 is a random access memory that stores a plurality of tags.

The tag RAM 410 compares the output signal 404 with the stored tags. The tag RAM 410 generates a cache hit signal when a matched tag is found, and generates a cache miss signal when a matched tag is not found.

The instruction RAM 420 is a random access memory that stores a plurality of instructions.

According to other embodiments, the cache hit signal and the cache miss signal may be embodied into a single signal. When the single signal is "0", it may correspond to a cache hit state, and when the single signal is "1", it may correspond to a cache miss state. Conversely, when the single signal is "0", it may correspond to the cache miss state, and when the single signal is "1", it may correspond to the cache hit state.

When the cache miss signal is received, the instruction RAM 420 receives an instruction from the external memory 150 and stores the received instruction.

In this case, the instruction to be newly stored in the instruction RAM 420 replaces the pre-stored instruction.

The above-described process in which a cache miss occurs and the instruction cache 120 receives an instruction from the external memory 150 and stores the received instruction is referred to as "a line filling process". Generally, the line filling process requires a relatively long period of time in comparison to an instruction performance time. The relatively long period of time that is spent for the line filling process is referred to as "a penalty of a cache miss".

When the cache miss occurs in the instruction cache 110, the relatively long period of time may be spent for the line filling process and the penalty of the cache miss may affect the entire program performance time.

In the processor 100 according to an exemplary embodiment, the instruction cache 120 sequentially pre-traces the first instruction during the second operational mode, and determines whether the cache miss occurs. The first instruction is performed during the first operational mode, and the first instruction includes a set of sequential instructions to be performed by the processor core 110. If it is determined the cache miss may occur, the instruction cache 120 stores the first instruction corresponding to the cache miss through the line filling process.

When the second operational mode is terminated and the first operational mode is restarted, the processor core 110 sequentially performs the first instruction. Since the instruction cache 120 pre-stores the first instruction corresponding to the cache miss, the cache miss occurs relatively less frequently with respect to the first instruction that is performed during the first operational mode.

It is assumed that the processor 100 performed instructions "0000" and "0001" during an initial first operational mode, and the first operational mode was followed by the second operational mode.

The instruction "0000" denotes, in binary format, an instruction corresponding to a program counter value "0000".

Also, it is assumed that when the second operational mode is terminated and the first operational mode is restarted, instructions "0010", "0011", "0100", and "0101" are sequentially performed in the processor core 110.

During the second operational mode, the instruction cache 120 sequentially traces the instructions "0010", "0011", "0100", and "0101", and determines whether a cache miss would occur.

If the cache miss associated with the instruction "0100" would occur, the instruction cache 120 receives the instruction "0100" from the external memory 150 and stores the received instruction "0100" in the instruction cache 120.

When the second operational mode is terminated and the first operational mode is restarted, the processor core 110 sequentially performs the instructions "0010", "0011", 11010011, and "0101".

Since the instruction "0100" is pre-stored in the instruction cache 120, the cache miss does not occur during the first operational mode.

As described above, the processor 100 according to an exemplary embodiment pre-traces instructions to be performed by the instruction cache 120 in the future and thereby detects the cache miss while the processor core 110 does not access the instruction cache 120. Therefore, it is possible to reduce a frequency that the cache miss occurs when the processor core 110 is performing instructions.

When the cache hit signal is received, the instruction RAM 420 transfers to the processor core 110 an instruction, corresponding to the output signal 404, from among instructions that are stored in the instruction RAM 420.

According to other embodiments, the tag RAM 410 may receive the mode signal 401, and generate the cache hit signal only when the mode signal 401 corresponds to the first operational mode. In this case, the instruction RAM 420 receives the cache hit signal only during the first operational mode. Therefore, the instruction RAM 420 may not transfer the instruction to the processor core 110 during the second operational mode.

Also, the instruction RAM 420 may receive the mode signal 401, and transfer the instruction to the processor core 110 in correspondence to the cache hit signal only when the mode signal 401 corresponds to the first operational mode.

When the mode signal 401 is a signal corresponding to a second operational mode, the decoder 430 generates the pseudo PC signal 403 based on the output signal 404.

In this case, the output signal 404 denotes a current pseudo PC value, and the pseudo PC signal 403 generated by the decoder 430 denotes a subsequent pseudo PC.

When a current instruction corresponding to the output signal 404 is a normal instruction, the decoder 430 adds '1' to the current pseudo PC value to generate the subsequent pseudo PC value.

According to other embodiments, a part of the output signal 404 denotes the type of the current instruction, which is referred to as "a field".

When the field of the output signal 404 indicates that the current instruction is a conditional branch instruction, the decoder 430 terminates the tracing process.

The conditional branch instruction is an instruction to jump from one program location to another program location when a specified condition is satisfied.

The conditional branch instruction is either taken or not taken depending on whether the specified condition is satisfied.

The specified condition may be based on the size of a value that is stored in a register, operational results of a previous instruction, and the like.

The processor core 110 may access the internal register file 210 and the external memory 150 during the first operational mode. Therefore, there is no problem to identify whether the specified condition is satisfied. However, the instruction cache 120 or the decoder 430 of the instruction cache 120 may not freely access the register file 210 that is included in the processor core 110. Therefore, it is impossible to identify whether the specified condition is satisfied.

Accordingly, when the current instruction corresponding to the output signal 404, indicating the current pseudo PC value points to, is the conditional branch instruction, the decoder 430 terminates the tracing process.

When the current instruction traced by the output signal 404 is the conditional branch instruction, the decoder 430 terminates the tracing process without further performing a prediction process and thereby detects only the cache miss that will definitely occur in the future.

The processor 100 according to the present exemplary embodiment detects only the cache miss that will definitely occur in the future. Therefore, in any case, it is possible to decrease the frequency that a cache miss occurs during the first operational mode. However, unlike certain embodiments disclosed herein, if a branch taken/not taken is predicted and a tracing process continues when the conditional branch instruction is traced, and in this instance, the prediction is incorrect, the cache miss may more frequently occur when the processor 100 is performing instructions during the first operational mode.

Also, the decoder 430 may maintain a value of the current pseudo PC as a value of the subsequent pseudo PC and thereby terminate the tracing process. Specifically, the decoder 430 may maintain the pseudo PC signal 403 as is without changing it, and thereby terminate the tracing process.

Conversely, when the field of the output signal 404 indicates that the current instruction is an unconditional branch instruction, the decoder 430 reflects an offset of the current instruction in the value of the subsequent pseudo PC.

The unconditional branch instruction is a type of an instruction in which a branch is taken in any case. The conditional branch instruction or the unconditional branch instruction includes an offset field. A value of the offset field is added to the current PC value to generate the subsequent PC value.

When the current instruction is the unconditional branch instruction, the decoder 430 adds the value of the offset field in the current PC value to generate the subsequent PC value. The decoder 430 outputs the generated subsequent PC value as the PC signal 403.

When the field of the output signal 404 indicates that the current instruction is an RTS instruction, the decoder 430 sets a target PC value of the RTS instruction to the value of the subsequent pseudo PC.

The target PC value of the RTS instruction is stored in the RTS buffer 440.

The RTS buffer 440 is in the form of stacks and is a last input first output (LIFO) memory in which a first PC value outputted is a last PC value inputted.

The RTS buffer 440 receives the mode signal 401 and the output signal 404 of the multiplexer 460.

When the mode signal 401 is a signal corresponding to the first operational mode and the field of the output signal 404 indicates that the current instruction is a branch and link (BRL) instruction, the RTS buffer 440 stores a value of a PC corresponding to the output signal 404.

The BRL instruction is an instruction that is performed to support calling of a function and the like. The BRL instruction stores a subsequent PC value of a PC before being branched as a target PC value.

A subroutine is started by the BRL instruction and is terminated by the RTS instruction. When the subroutine is terminated, another instruction is performed in a location following a location before being branched.

The processor core 100 stores the subsequent PC value of the BRL instruction in a reserved space of the register file 210 during the first operational mode. The stored subsequent PC value is also the target PC value of the RTS instruction.

According to other embodiments, the decoder 430 receives the target PC value of the RTS instruction from the RTS buffer 440.

Also, the RTS buffer 440 may consist of an N-bit counter and $2^N$ registers, and may be constructed using a circular buffer scheme.

Each register stores a PC value. The RTS buffer 440 may store a maximum of $2^N$ PC values.

The RTS buffer 440 may correspond to a maximum of $2^N$ recursions of a subroutine.

During the first operational mode, the RTS buffer 440 stores the subsequent PC value when the BRL instruction is performed, and outputs the stored target PC value when the RTS instruction is performed. The RTS buffer 440 outputs the stored target PC value and then deletes the output target PC value.

The above process in which the RTS buffer 440 stores the subsequent PC value when the BRL instruction is performed is referred to as "the subsequent PC value is pushed into the RTS buffer".

Also, the above process in which the RTS buffer 440 outputs and stores the stored target PC value when the RTS instruction is performed is referred to as "the stored target PC value is popped from of the RTS buffer".

When the PC value is pushed into or popped from of the RTS buffer 440, an index value to indicate a location corresponding to the PC value is increased or decreased, embodying a LIFO memory.

When the PC value is popped output of the RTS buffer 440, it is checked by the instruction cache 430.

During the second operational mode, the decoder 430 generates the subsequent PC value by using the popped PC value.

According to a first embodiment of the RTS buffer 440, when the BRL instruction is traced during the second operational mode, the RTS buffer 440 stores the pseudo PC value. In this instance, the RTS buffer 440 may store the pseudo PC value or a value that is obtained by adding '1' to the pseudo PC value.

When the RTS instruction is traced during the second operational mode, the RTS buffer 440 outputs the target PC value to the decoder 430.

When the second operational mode is terminated and the first operational mode is restarted, the RTS buffer 440 is restored to a previous state of the second operational mode.

According to a second embodiment of the RTS buffer 440, when the RTS instruction is traced during the second operational mode, the RTS buffer 440 outputs the target PC value to the decoder 430.

When the BRL instruction is traced during the second operational mode, the RTS buffer 440 takes a branch and does not store the pseudo PC value or the value that is obtained by adding '1' to the pseudo PC value.

According to the second embodiment, the decoder 430 terminates the tracing process when the BRL instruction is traced and the RTS instruction corresponding to the traced BRL instruction is also traced during the second operational mode.

The path recorded memory 450 receives the mode signal 401 and the output signal 404 of the multiplexer 460.

When the mode signal 404 is a signal corresponding to the second operational mode, the path recorded memory 450 stores a path record corresponding to the output signal 404.

The path record may also be referred as "a trace record".

The path record of the path recorded memory 450 is completely reset in the case of entry into the second operational mode. In the reset process, all bits of the path recorded memory 450 are set to '0'.

The path recorded memory 450 includes as many bits as the number of instructions that can be stored in the instruction RAM 420.

Operational principles of the path recorded memory 450 are as follows below.

When the cache hit occurs in the tag RAM 410, the path recorded memory 450 sets to '1' a bit corresponding to the output signal 404. The output signal 404 corresponds to the current PC and the current PC denotes the current instruction.

Since the cache hit occurs and the instruction RAM 420 stores the current instruction, the path record related thereto is stored in the path recorded memory 450.

When the cache miss occurs in the tag RAM 410, the path recorded memory 450 determines whether the bit corresponding to the output signal 404 is '1'. When the bit corresponding to the output signal 404 is '1', the path recorded memory 450 transmits to the decoder 430 a signal corresponding to a trace termination.

Also, when the cache miss occurs in the tag RAM 410 and the bit corresponding to the output signal 404, among bits stored in the path recorded memory 450, is '0', the instruction RAM 420 receives from the external memory 150 the instruction corresponding to the output signal 404, and stores the received instruction.

When the cache miss occurs, the instruction RAM 420 stores the received instruction, instead of the pre-stored instruction. Therefore, information about the pre-stored instruction is lost in the instruction RAM 420.

If the lost instruction is performed prior to the newly stored instruction during the first operational mode, the cache miss may unnecessarily frequently occur due to the line filling process. Therefore, to decrease the occurrence frequency of the cache miss, there is a need for a process of storing a path record, that is, a trace record, regarding whether the instruction lost in the instruction RAM 420 has been traced by the line filling process.

The path recorded memory 450 may prevent at least once referenced instruction in the instruction RAM 420 from being evicted from the instruction RAM 420 due to the line filling process.

According to other embodiments, the instruction RAM 420 may consist of a plurality of lines that include a plurality of instructions, respectively. For example, when one line is 64 bytes, the line may include 16 instructions.

The cache hit or the cache miss of the instruction RAM 420 may be determined for each line. In this instance, the path recorded memory 450 includes as many bits as the number of lines, instead of the number of instructions.

Also, the path recorded memory 450 stores, for each line, the path record regarding whether any one of instructions, included in each line of the instruction RAM 420 has been traced.

Figure 5:
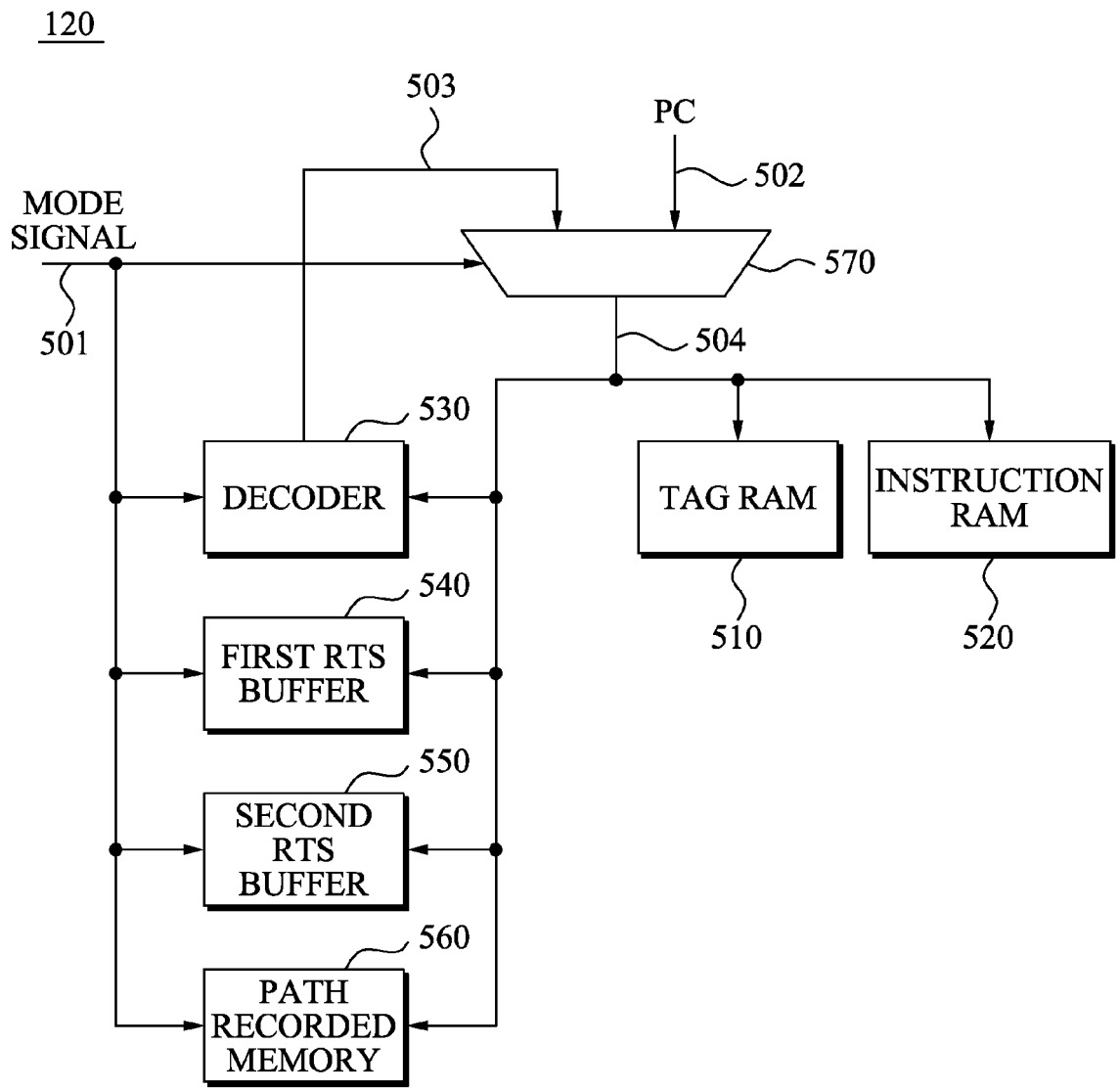
FIG. 5 is a diagram illustrating another example of the instruction cache of FIG. 1.

FIG. 5 is a diagram illustrating another example of the instruction cache 120 of FIG. 1.

Referring to FIG. 5, the instruction cache 120 includes a tag RAM 510, an instruction RAM 520, a decoder 530, a first RTS buffer 540, a second RTS buffer 550, a path recorded memory 560, and a multiplexer 570.

Operations of the tag RAM 510, the instruction RAM 520, the decoder 530, the path recorded memory 560, and the multiplexer 570 are similar to descriptions made with reference to FIG. 4, and thus will be omitted here.

A PC signal 502 is received from the processor core 110, and denotes a PC value corresponding to an instruction that is performed during the first operational mode.

The first RTS buffer 540 receives a mode signal 501 and an output signal 504 of the multiplexer 570.

When the BRL instruction is performed in the processor core 110 during the first operational mode, the first RTS buffer 540 stores the PC value or a value that is obtained by adding '1' to the PC value.

When the RTS instruction is performed in the processor core 110 during the first operational mode, the first RTS buffer 540 deletes the stored PC value.

The first RTS buffer 540 maintains stored PC values as they are during the second operational mode.

The second RTS buffer 550 receives the mode signal 501 and the output signal 504 of the multiplexer 570.

When the second operational mode is started, the second RTS buffer 550 copies PC values that are stored in the first RTS buffer 540.

When the BRL instruction is performed by the output signal 504 during the second operational mode, the second RTS buffer 550 stores a value that is obtained by adding '1' to a value of the output signal 504.

When the RTS instruction is performed based on the output signal 504 during the second operational mode, the second RTS buffer 550 outputs to the decoder 530 a PC value that is stored in an outermost layer.

The decoder 530 outputs, as a pseudo PC signal 503, the PC value that is received from the second RTS buffer 550.

According to other embodiments, the second RTS buffer 550 may delete all the stored PC values when the second operational mode is terminated.

When the cache miss occurs, it takes a relatively long period of time to perform the general instruction until the instruction RAM 520 receives the instruction from the external memory 150.

When the instruction RAM 520 is receiving the instruction from the external memory 150, the processor core 110 in the case of the first operational mode or the instruction cache 120 in the case of the second operational mode may suspend operations until the line filling process is completed.

The above suspended operation state to wait for the line filling process to be completed is referred to as "a stall state".

When the instruction cache 120 is in the stall state in the course of pre-tracing a future instruction, and in this instance, the second operational mode is terminated and the first operational mode is restarted, the instruction cache 120 operates in response to a request from the processor core 110 after the line filling process is completed.

Figure 6:
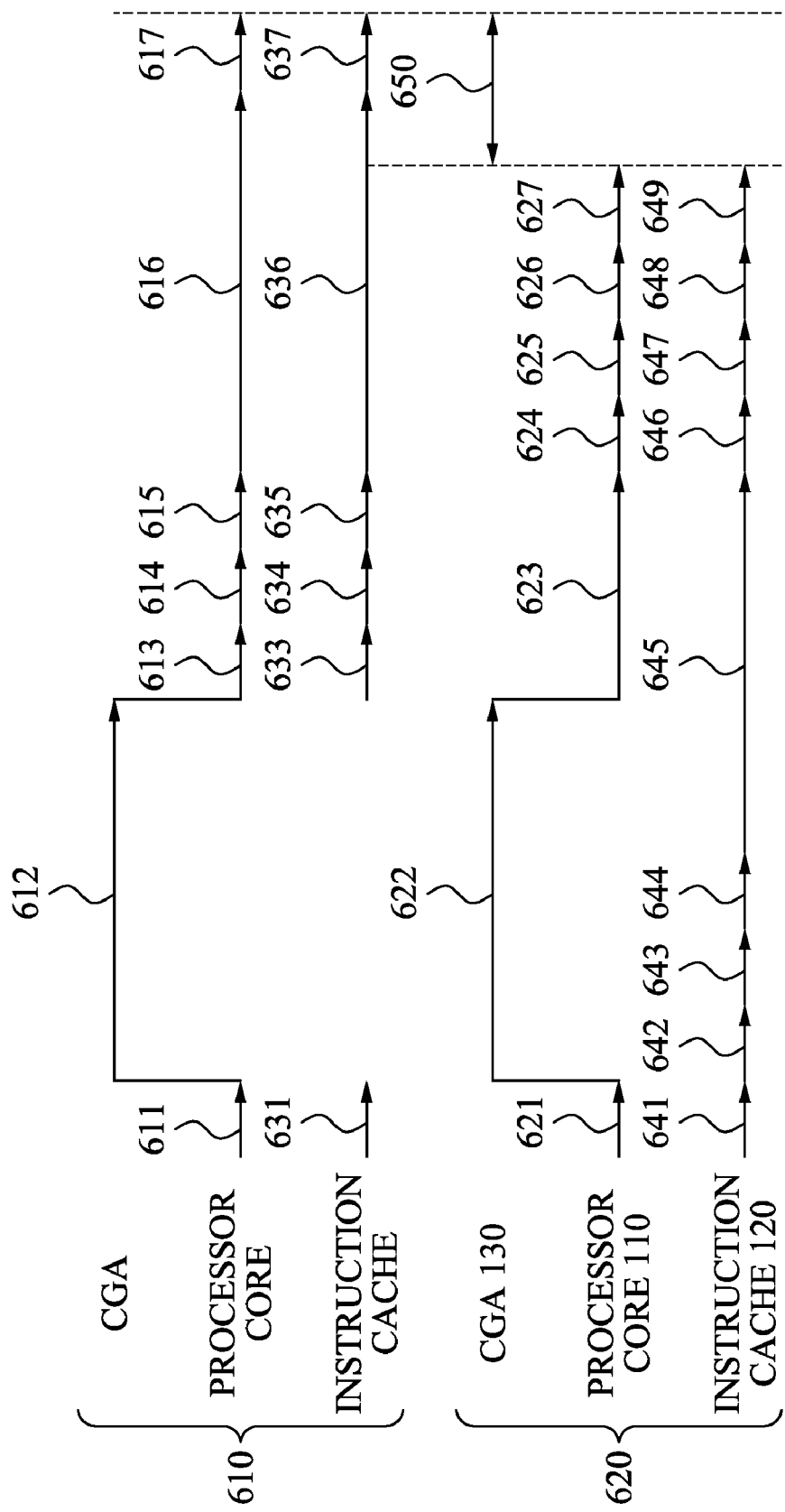
FIG. 6 illustrates an effect of reducing the entire instruction performance time, taken by a processor, according to an exemplary embodiment.

FIG. 6 illustrates an effect of reducing the entire instruction performance time, taken by a processor, according to an exemplary embodiment.

Referring to FIG. 6, the length of each arrow denotes the length of time that is spent to perform a process corresponding to the arrow.

A waveform 610 denotes a process in which an instruction is performed in a general processor.

A process 611 denotes a process in which a processor core performs the instruction during a first operational mode. In this instance, an instruction cache outputs to the processor core an instruction corresponding to the process 611. Another process 631 denotes elapse of time that the instruction cache experiences while the process 611 is being performed.

With respect to the instruction corresponding to the process 611, it is assumed that a cache hit occurred.

When a second operational mode is started, a CGA performs instructions. Still another process 612 denotes a process in which the CGA performs instructions.

When the second operational mode is terminated and the first operational mode is restarted, the processor core and the instruction cache start their operations.

Processes 613, 614, and 615 denote a process in which the processor core performs instructions. In this instance, the instruction cache outputs to the processor core instructions corresponding to the processes 613, 614, and 615 respectively. Processes 633, 634, and 635 denote elapse of time that the instruction cache experiences while the processes 613, 614, and 615 are being performed, respectively.

Still another process 636 denotes a line filling process regarding an instruction in which a cache miss occurs. Still another process 616 denotes elapse of time that the processor core experiences while the process 636 is being performed. An instruction that is fetched from the external memory 150 during the process 636 is performed in the processor core through still another process 617.

Still another process 637 denotes elapse of time that the instruction cache experiences while the process 617 is being performed.

Another waveform 620 denotes a process in which an instruction is performed in the processor 100.

A process 621 denotes a process in which the processor core 110 performs the instruction during the first operational mode. In this instance, the instruction cache 120 outputs to the processor core 110 an instruction corresponding to the process 621. Another process 641 denotes elapse of time that the instruction cache 120 experiences while the process 621 is being performed.

With respect to the instruction corresponding to the process 621, it is assumed that the cache hit occurred.

When the second operational mode is started, the CGA 130 performs instructions. Still another process 622 denotes a process in which the CGA 130 performs instructions.

The instruction cache 120 pre-traces instructions to be performed in the future by the processor core 110 during the second operational mode. The instruction cache 120 pre-traces instructions corresponding to processes 624, 625, 626, and 627 through processes 642, 643, 644, and 645 respectively.

As shown in FIG. 6, as a result of the pre-tracing by the instruction cache 120, the cache miss occurred in the fourth instruction. The process 645 denotes the line filling process of the instruction in which the cache miss occurred.

When the second operational mode is terminated and the first operational mode is restarted when the process 645 is being performed, the processor 100 waits for the process 645 being completed and starts the operation of the first operational mode after the completion of the process 645.

Another process 623 denotes elapse of time that the processor core 110 experiences when the process 645 is being performed.

The processes 624, 625, and 626 denote a process in which the processor core 110 performs the instruction. In this instance, the instruction cache 120 outputs to the processor core 110 instructions corresponding to the processes 624, 625, and 626 respectively. Processes 646, 647, and 648 denote elapse of time that the instruction cache 120 experiences when the processes 624, 625, and 626 are being performed, respectively.

Still another process 627 denotes a process in which the processor core 110 performs the instruction. In this instance, the instruction cache 120 outputs to the processor core 110 the instruction corresponding to the process 627. Since the instruction corresponding to the process 627 is stored in the instruction cache 120 through the instruction pre-tracing of the instruction cache 120, an additional line filling process is not required.

Still another process 649 denotes elapse of time that the instruction cache 120 experiences when the process 627 is being performed.

As a result of comparison between the waveforms 610 and 620, when performing the same instructions, the processor 100 has a reduction 650 of time of the entire instruction performance time in comparison to the general processor.

In exemplary embodiments, the processor 100 includes the processor core 110 and the CGA 130, and the processor core 110 is a VLIW processor. However, it is not limited thereto. For example, the embodiments and teaching disclosed herein may be applicable even when the processor core 110 is a reduced instruction set computer (RISC) processor.

Also, it will be apparent to those of skills in the art that the embodiments and teachings disclosed herein may be applicable to a processor structure in which at least two operational modes are provided, the operational modes are not performed simultaneously, and the operational modes do not share an instruction memory.

Figure 7:
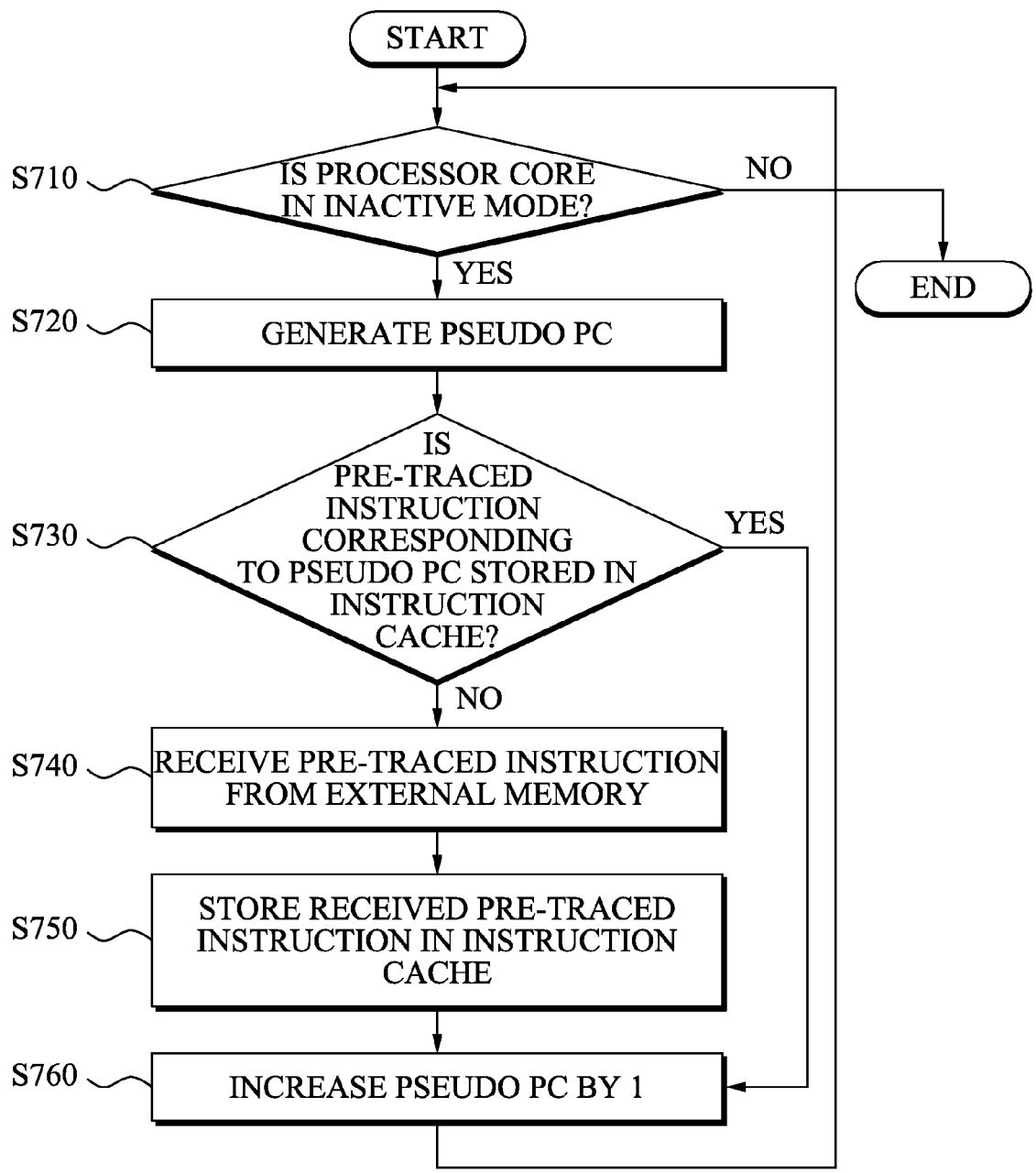
FIG. 7 is a flowchart illustrating a method of managing an instruction cache according to an exemplary embodiment.

FIG. 7 is a flowchart illustrating a method of managing an instruction cache according to an exemplary embodiment.

Referring to FIG. 7, in operation S710, the instruction cache management method determines whether a processor core is in an inactive mode.

In operation S720, when the processor core is in the inactive mode, the instruction cache management method generates a pseudo PC.

In operation S730, the instruction cache management method determines whether a pre-traced instruction corresponding to the pseudo PC is stored in the instruction cache.

In operation S740, when the pre-traced instruction is not stored in the instruction cache, the instruction cache management method receives the pre-traced instruction from an external memory.

According to other embodiments, when the pre-traced instruction is not stored in the instruction cache, the instruction cache management method may determine whether to receive the pre-traced instruction from the external memory by considering a trace history (path record) of the pre-traced instruction.

In operation S750, the instruction cache management method stores the received pre-traced instruction in the instruction cache.

In operation S760, the instruction cache management method increases the pseudo PC by '1' after performing operation S750.

Also, in operation S760, when the pre-traced instruction is determined to be stored in the instruction cache in operation S730, the instruction cache management method may increase the pseudo PC by '1'.

The instruction cache management method performs operation S760 and then returns to operation S710.

When the processor core is in an active mode, the instruction cache management method is terminated.

According to other embodiments, when the processor core is in the active mode, the instruction cache may perform operations of a general instruction cache, that is, may provide an instruction in response to a request from the processor core.

Figure 8:
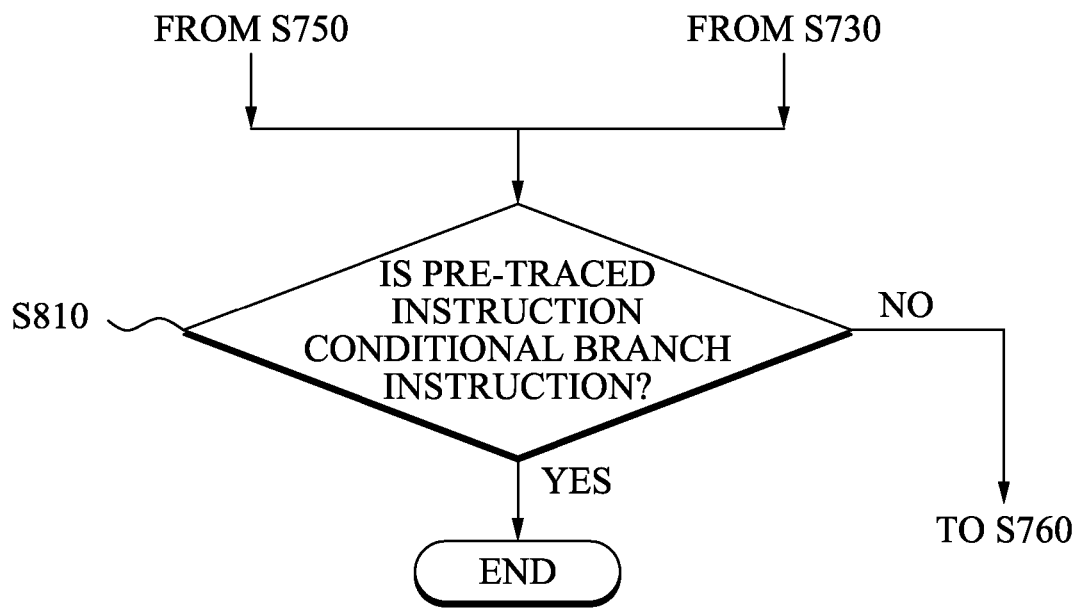
FIG. 8 is a flowchart illustrating a method of managing an instruction cache according to another exemplary embodiment.

FIG. 8 is a flowchart illustrating a method of managing an instruction cache according to another exemplary embodiment.

Referring to FIG. 8, when the pre-traced instruction is stored in the instruction cache after performing operation S750 or as a result of the determination of operation S730, the instruction cache management method determines whether the pre-traced instruction is a conditional branch instruction in operation S810.

When the pre-traced instruction is the condition branch instruction, the instruction cache management method is terminated.

Conversely, when the pre-traced instruction is not the conditional branch instruction, the instruction cache management method performs operation S760.

The instruction cache management method may detect only a cache miss that will definitely occur in the future although the instruction cache does not access a register file of the processor core, and store the detected cache miss in the instruction cache and thereby prevent the cache miss from occurring in the future.

Figure 9:
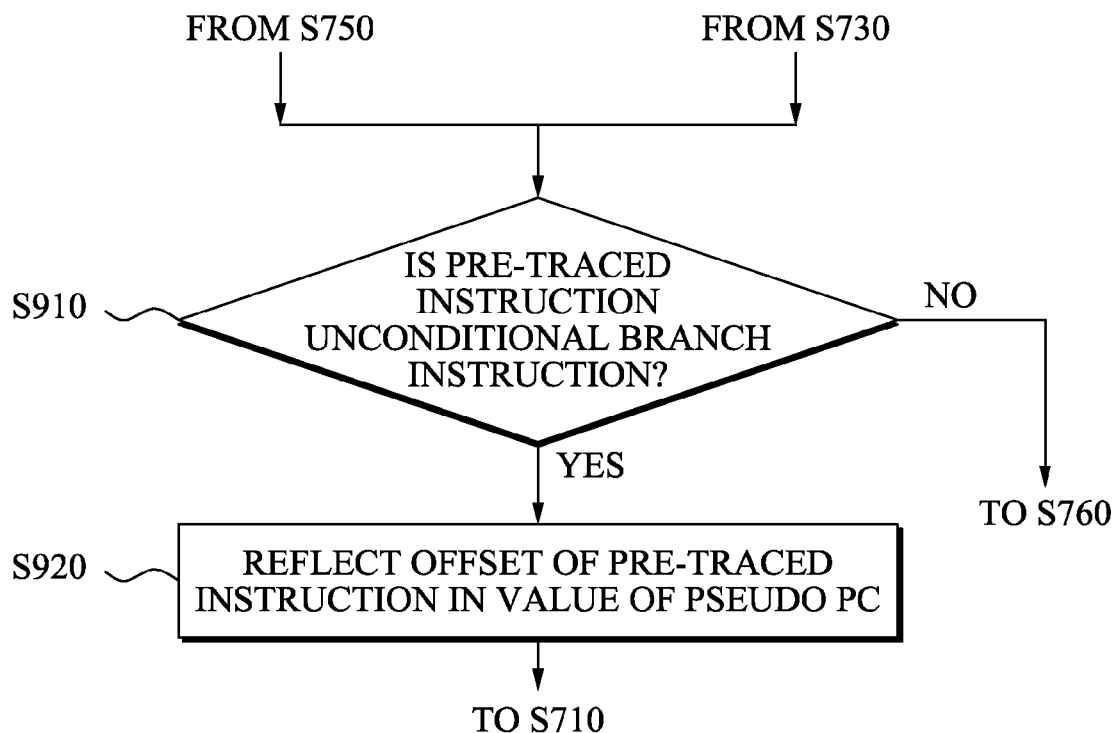
FIG. 9 is a flowchart illustrating a method of managing an instruction cache according to still another exemplary embodiment.

FIG. 9 is a flowchart illustrating a method of managing an instruction cache according to still another exemplary embodiment.

Referring to FIG. 9, when the pre-traced instruction is stored in the instruction cache after performing operation S750 or as a result of the determination of operation S730, the instruction cache management method determines whether the pre-traced instruction is an unconditional branch instruction in operation S910.

In operation S920, when the pre-traced instruction is the unconditional branch instruction, the instruction cache management method reflects an offset of the pre-traced instruction in a value of the pseudo PC.

The instruction cache management method performs operation S920 and then performs operation S710 again.

Conversely, when the pre-traced instruction is not the unconditional branch instruction, the instruction cache management method performs operation S760.

Figure 10:
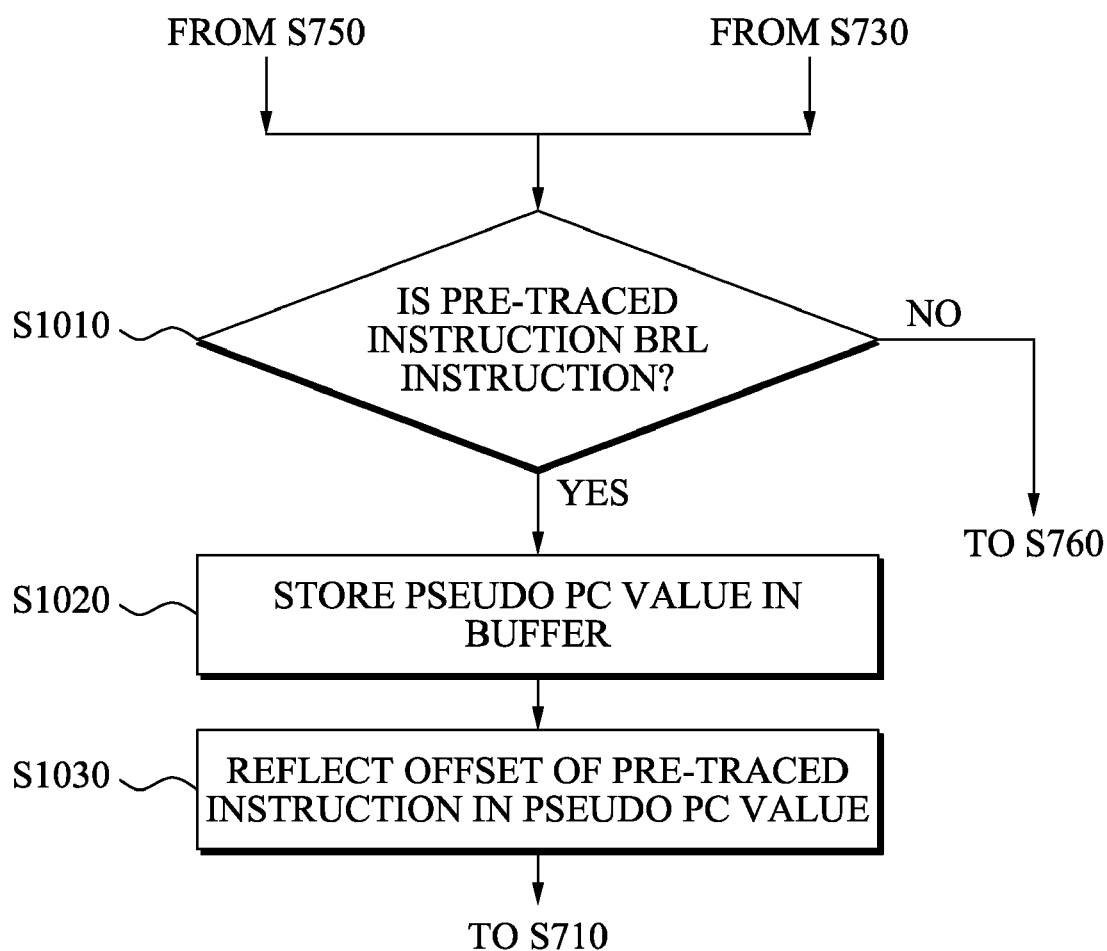
FIG. 10 is a flowchart illustrating a method of managing an instruction cache according to yet another exemplary embodiment.

FIG. 10 is a flowchart illustrating a method of managing an instruction cache according to yet another exemplary embodiment.

Referring to FIG. 10, when the pre-traced instruction is stored in the instruction cache after performing operation S750 or as a result of the determination of operation S730, the instruction cache management method determines whether the pre-traced instruction is a BRL instruction in operation S1010.

In operation S1020, when the pre-traced instruction is the BRL instruction, the instruction cache method stores a pseudo PC value in a buffer.

In operation S1030, the instruction cache management method reflects an offset of the pre-traced instruction in the pseudo PC value after performing operation S1020.

The instruction cache management method performs operation S1030 and then performs operation S710 again.

Conversely, when the pre-traced instruction is not the BRL instruction, the instruction cache management method performs operation S760.

Figure 11:
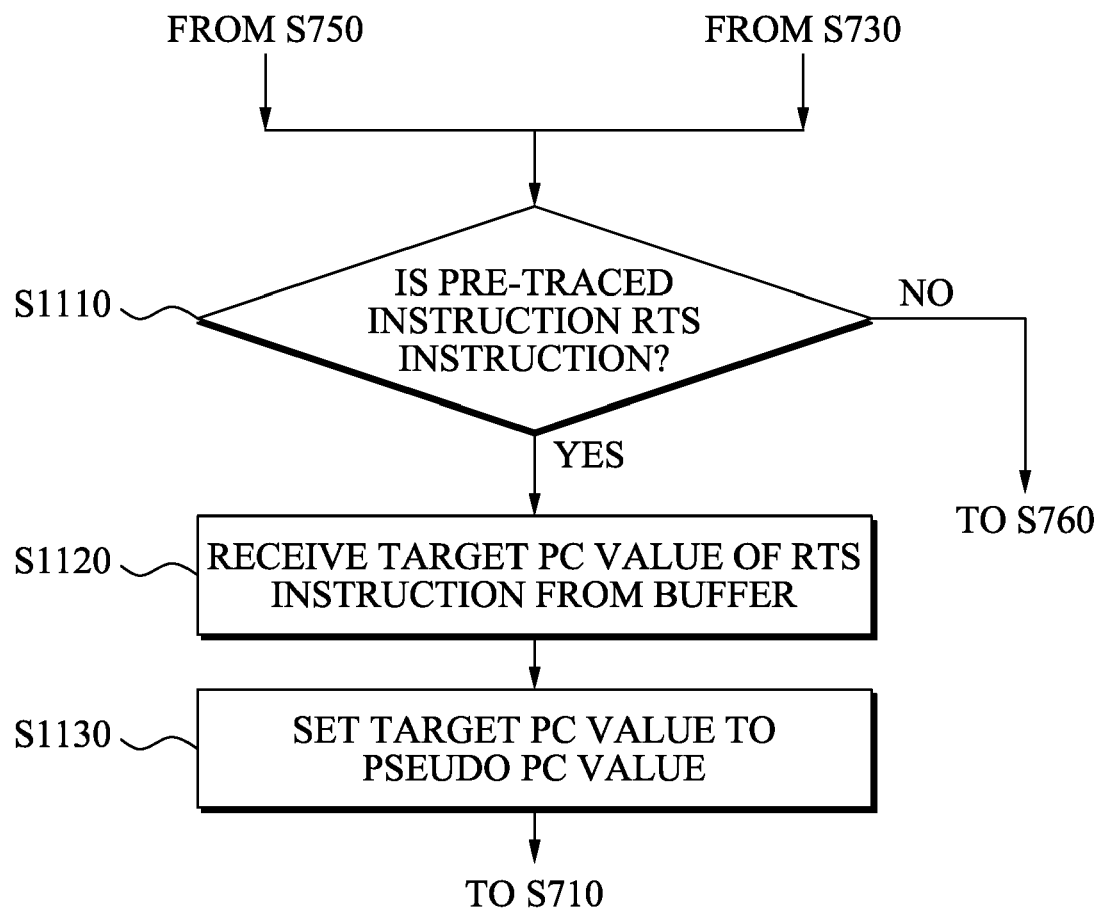
FIG. 11 is a flowchart illustrating a method of managing an instruction cache according to another exemplary embodiment.

FIG. 11 is a flowchart illustrating a method of managing an instruction cache according to another exemplary embodiment.

Referring to FIG. 11, when the pre-traced instruction is stored in the instruction cache after performing operation S750 or as a result of the determination of operation S730, the instruction cache management method determines whether the pre-traced instruction is an RTS instruction in operation S1110.

In operation S1120, when the pre-traced instruction is the RTS instruction, the instruction cache management method receives a target PC value of the RTS instruction from the buffer.

In operation S1130, the instruction cache management method sets the target PC value to the pseudo PC value after performing operation S1120.

The instruction cache management method performs operation S1130 and then performs operation S710 again.

Conversely, when the pre-traced instruction is not the RTS instruction, the instruction cache management method performs operation S760.

Figure 12:
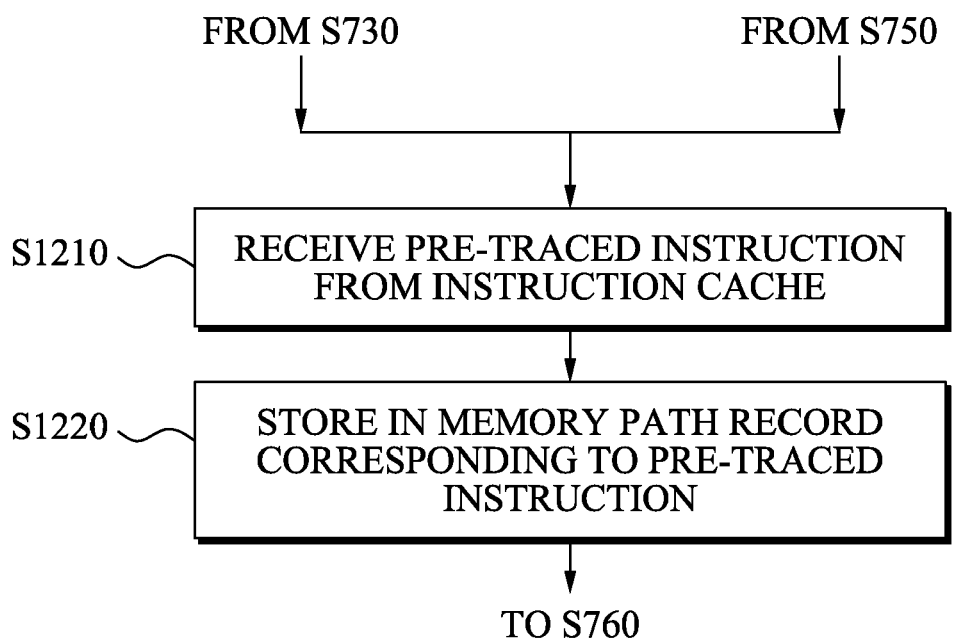
FIG. 12 is a flowchart illustrating a method of managing an instruction cache according to another exemplary embodiment.

FIG. 12 is a flowchart illustrating a method of managing an instruction cache according to another exemplary embodiment.

Referring to FIG. 12, when the pre-traced instruction is stored in the instruction cache after performing operation S750 or as a result of the determination of operation S730, the instruction cache management method receives the pre-traced instruction from the instruction cache in operation S1210.

In operation S1220, the instruction cache management method stores in a memory a path record corresponding to the pre-traced instruction.

The instruction cache management method performs operation S1220 and then performs operation S760.

According to other embodiments, when the pre-traced instruction is stored in the instruction cache as a result of the determination of operation S730, the instruction cache management method may set to '1' the path record corresponding to the pre-traced instruction and perform operation S760.

Also, according to other embodiments, the instruction cache management method may set the path record based on a PC corresponding to the pre-traced instruction.

Conversely, when the pre-traced instruction is not stored in the instruction cache as a result of the determination of operation S730, the instruction cache management method determines whether the path record corresponding to the pre-traced instruction is set to '1'.

When the path record corresponding to the pre-traced instruction is set to '1', the instruction cache management method is terminated.

When the path record corresponding to the pre-traced instruction is set to '0', the instruction cache management method performs operation S740.

The instruction cache management method may enable the instruction, which has been traced once and is stored in the instruction cache, to not be evicted from the instruction cache and thereby prevent cache pollution.

The methods described above including the instruction cache management method may be recorded, stored, or fixed in one or more computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as fabricated by a compiler, and files containing higher level code that may be executed by the computer using an interpreter. The described hardware devices may be configured to act as one or more software modules in order to perform the operations of the above-described embodiments.

According certain embodiments described above, there are provided a method which eliminate a cache miss, which would occur in the future, without using a predictive algorithm, and a processor of using the method.

According certain embodiments described above, it is possible to reduce the complexity of a cache and a processor, and also to eliminate a cache miss, which would occur in the future.

According certain embodiments described above, it is possible to eliminate only a cache miss, which definitely occurs in the future and thereby reduce an instruction performance cycle in any case, without a penalty caused by a prediction failure.

According certain embodiments described above, it is possible to eliminate a cache miss without contention when accessing an available memory, and reduce an instruction performance cycle.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A processor configured to switch back and forth between two operational modes, the processor comprising:
   a processor core which is operated during a second operational mode and which sequentially performs a first set of instructions during the second operational mode;
   an instruction cache that generates a pseudo-program counter corresponding to the first set of instructions, pre-traces the first set of instructions based on the pseudo-program counter, and determines, during the first operational mode, whether the processor core will meet a cache miss with regard to the first set of instructions, wherein if it is determined that the processor core will meet a cache miss, the instruction cache receives the first set of instructions from a memory and stores the first set of instructions;
   a coarse-grained array which is operated during the first operational mode and which performs a second instruction during the first operational mode; and
   a configuration memory which stores configuration information that is used by the coarse-grained array to perform the second instruction,
   wherein, when the processor switches from the first operational mode to the second operational mode, if the instruction cache is not finished receiving the first set of instructions from the memory, the instruction cache continues to receive the remaining first set of instructions during the second operational mode and the processor core begins performing the first set of instructions by sequentially performing the first set of instructions that have been received.

2. The processor of claim 1, wherein the instruction cache terminates the trace when the traced first set of instructions includes a conditional branch instruction.

3. The processor of claim 1, wherein the instruction cache reflects an offset of the first set of instructions in a value of the pseudo program counter when the traced first set of instructions includes an unconditional branch instruction.

4. The processor of claim 1, wherein the instruction cache sets a target program counter value of a return from subroutine (RTS) instruction to a value of the pseudo program counter when the traced first set of instructions includes the RTS instruction.

5. The processor of claim 4, wherein the instruction cache comprises:
   a last in first out (LIFO) buffer which stores a program counter value of a branch and link (BRL) instruction when the BRL instruction is performed in the processor core, and
   the target program counter value is received from the LIFO buffer.

6. The processor of claim 5, wherein the instruction cache restores the LIFO buffer to a previous state of the first operational mode when the first operational mode is switched to the second operational mode.

7. The processor of claim 5, wherein the LIFO buffer stores the pseudo program counter value when the traced first set of instructions includes the BRL instruction.

8. The processor of claim 5, wherein the instruction cache further comprises:
   a second LIFO buffer which stores the pseudo program counter value when the traced first set of instructions includes the BRL instruction.

9. The processor of claim 5, wherein the instruction cache does not store the pseudo program counter value in the LIFO buffer even when the traced first set of instructions includes the BRL instruction, and terminates a trace when an RTS corresponding to the BRL instruction is traced.

* * * * *